US008020948B2

(12) United States Patent
Inaoka

(10) Patent No.: US 8,020,948 B2
(45) Date of Patent: Sep. 20, 2011

(54) CRAWLER TRAVELING APPARATUS

(75) Inventor: Motonari Inaoka, Fujiidera (JP)

(73) Assignee: Kubota Corporation, Osaka (JP)

( * ) Notice: Subject to any disclaimer, the term of this patent is extended or adjusted under 35 U.S.C. 154(b) by 153 days.

(21) Appl. No.: 12/548,055

(22) Filed: Aug. 26, 2009

(65) Prior Publication Data
US 2010/0051358 A1 Mar. 4, 2010

(30) Foreign Application Priority Data

Aug. 27, 2008 (JP) ................................. 2008-218695
Aug. 27, 2008 (JP) ................................. 2008-218696
Aug. 27, 2008 (JP) ................................. 2008-218697

(51) Int. Cl.
*B62D 55/088* (2006.01)
(52) U.S. Cl. ........................................ 305/107; 180/9.1
(58) Field of Classification Search .................. 305/100, 305/107, 110; 180/9.1
See application file for complete search history.

(56) References Cited

U.S. PATENT DOCUMENTS

| 2,560,307 | A | * | 7/1951 | Slemmons | .................... | 305/110 |
| 5,873,424 | A | * | 2/1999 | Gustafson et al. | ............ | 180/9.1 |
| 7,832,814 | B2 | * | 11/2010 | Breton | .......................... | 305/110 |
| 2002/0195875 | A1 | * | 12/2002 | Brawley et al. | ............... | 305/107 |
| 2005/0275287 | A1 | * | 12/2005 | Breton | .......................... | 305/107 |

FOREIGN PATENT DOCUMENTS

| EP | 2 103 508 A1 | 9/2009 |
| JP | 2008-168876 A | 7/2008 |

* cited by examiner

*Primary Examiner* — Kevin Hurley
(74) *Attorney, Agent, or Firm* — The Webb Law Firm

(57) ABSTRACT

A crawler traveling apparatus includes a traveling vehicle body having a rear axle case, a track frame supported via a pivot shaft to the rear axle case, a pair of front and rear driven wheels mounted at front and rear end portions of the track frame, a pair of the rear driven wheels being provided on the right and left sides across a rear end portion of the track frame, a free wheel mounted at an intermediate portion of the track frame, a crawler entrained about a drive wheel, the front and rear driven wheels and the free wheel, a rearwardly downward inclined face formed at an upper portion of the rear end portion of the track frame, the inclined face being configured to cause an amount of earth/sand to drop off its surface; and a rear upper cover provided at an upper portion of the rear portion of the track frame in the vicinity of said inclined face, the rear upper cover forming a rear upper inclined face that is oriented downward in the right/left outward direction, the rear upper inclined face being configured to cause an amount of earth/sand to drop off its surface.

13 Claims, 9 Drawing Sheets

# CRAWLER TRAVELING APPARATUS

BACKGROUND OF THE INVENTION

1. Field of the Invention

The present invention relates to a crawler traveling apparatus, more particularly to a crawler traveling apparatus mounted in e.g. a rear section of a tractor.

2. Description of the Related Art

A semi-crawler tractor having a crawler type traveling apparatus as a "rear wheel" of the tractor, instead of a rear tired wheel is known from e. Japanese Patent Application "Kokai" No. 2008-168876. In this crawler traveling apparatus, a tack frame is pivotally supported via a pivot shaft to a rear axle case of a traveling machine body. At front and rear ends of this track frame, there are mounted front and rear driven wheels and at intermediate positions thereof, there are mounted front and rear free wheels. Upwardly of a front/rear intermediate position of the track frame, there is mounted a drive wheel which receives drive force from a rear axle supported to the rear axle case. Of the free wheels, the rear free wheels are pivoted to an equalizer link and a front/rear intermediate portion of this equalizer link is pivoted to the track frame 2 via a pivot shaft.

With such crawler traveling apparatus as described above, the upper face of the track frame is formed as a flat face. So, when an amount of earth, sand etc, adhering to the inner peripheral surface of the crawler may be raised in association with traveling of the crawler and then drop onto the upper face of the track frame to be eventually accumulated thereon. Especially, if a pair of right and left driven wheels are mounted across the rear end of the track frame, accumulation of sand, earth or the like may occur on the upper face of the track frame between the right and left driven wheels, thus making its removal difficult.

Further, with this conventional crawler traveling apparatus, as the track frame is formed narrower than the wheel rolling face of the crawler, the sand, earth or the like stuck to the inner peripheral face of the crawler may be raised in association with traveling of the crawler and then be placed directly on the wheel rolling face or it may be first accumulated on the upper face of the track frame and then become entrapped between the wheels and the wheel rolling face in the course of the circulatory movement of the crawler.

SUMMARY OF THE INVENTION

The principal object of the present invention is to restrict accumulation of an amount of sand, earth or the like on the track frame.

For accomplishing the above-noted object, a crawler traveling apparatus, according to the present invention, comprises:

a traveling vehicle body having a rear axle case;

a track frame supported via a pivot shaft to the rear axle case;

a pair of front and rear driven wheels mounted at front and rear end portions of the track frame, a pair of said rear driven wheels being provided on the right and left sides across a rear end portion of the track frame;

a free wheel mounted at an intermediate portion of the track frame;

a crawler entrained about a drive wheel, said front and rear driven wheels and said free wheel;

a rearwardly downward inclined face formed at an upper portion of the rear end portion of the track frame, said inclined face being configured to cause an amount of earth/sand to drop off its surface; and a rear upper cover provided at an upper portion of the rear portion of the track frame in the vicinity of said inclined face, said rear upper cover forming a rear upper inclined face that is oriented downward in the right/left outward direction, said rear upper inclined face being configured to cause an amount of earth/sand to drop off its surface.

Rear driven wheels are mounted in a pair on the right and left sides across the rear end of the track frame. And, also for the plurality of front and rear free wheels mounted at the intermediate portions, each of them is provided in a pair on the right and left sides. So, that these wheels roll on right and left wheel rolling faces on the inner peripheral face of the crawler. The right and left, rear driven wheels protrude respectively from the track frame in the right/left direction. An amount of earth/sand placed on the inner peripheral face of the crawler will be raised in association with traveling of this crawler and will eventually drop onto the upper face of the track frame. The rear upper cover provided at a rear portion of the track frame and covering its upper face will guide the amount of earth/sand being dropped to the outer sides in the right/left direction by means of its rear upper inclined face oriented downward in the right/left outward direction.

At the upper portion of the rear end of the track frame between the right and left rear driven wheels, there is formed the rearwardly downward inclined face, so that an amount of earth/sand placed thereon will not be accumulated on the track frame, but will be caused to drop rearwardly of the same.

This amount of earth/sand removed from the track frame will drop onto the inner peripheral face of the crawler. And, in association with traveling of the crawler, the earth/sand will be raised again. With repetition of the above cycle, the earth/sand will drop onto the rear upper cover and will eventually be removed from the right and left wheel rolling faces.

The inclined face provided at the upper portion of the rear end of the track frame can be realized as a projecting portion having a mountain-like profile in its side view and provided at the upper portion of the rear end of the track frame. As the rear upper cover having the rear upper inclined face has a mountain-like shape in its front view, an amount of sand/earth being dropped can be discharged and removed reliably in the right/left direction. And, since at a rear end of this rear upper cover, there is formed an eaves-like portion that projects from the rear upper inclined face to the vicinity of the outer side face of the right/left driven wheel and that is inclined downward in the forward direction, it is possible to prevent the earth/sand from dropping toward the right/left rear driven wheels and also the amount of earth/sand circulated on the right/left wheel rolling face can be discharged to the right/left outer side.

For accomplishing the above-noted object, in a similar, but different crawler traveling apparatus according to the present invention, comprises a cover provided at a rear portion of the track frame described above, the cover covering upper face and right and left side faces of the track frame; wherein said cover includes:

a rear upper inclined face that is located in the upper face of the track frame and oriented downward in the right/left outward direction, said rear upper inclined face being configured to cause an amount of earth/sand to drop off its surface; and a side inclined face that is located on each one of right and left side faces of the track frame and oriented downward in the right/left outward direction, said side inclined face being configured to cause an amount of earth/sand to drop off its surface.

The rear upper inclined face that is located in the upper face of the track frame and oriented downward in the right/left outward direction guides an amount of earth/sand being dropped to the outer side in the right/left direction, and the side inclined face that is located on each one of right and left side faces of the track frame and oriented downward in the right/left outward direction guides the earth/sand being dropped, thus preventing the earth/sand from being placed on the right/left wheel rolling face of the inner peripheral face of the crawler.

The right and left free wheels also project outward from the track frame in the right/left direction and each side inclined face prevents the earth/sand from being placed on the right/left wheel rolling face at the portion where the amount of earth/sand raised in association with traveling of the crawler is to drop. In this cover, the rear upper cover having the rear upper inclined face has a mountain-like shape in its front view, and the side cover having the side inclined face is provided on each one of the right and left side faces of the track frame, whereby the amount of earth/sand being dropped can be discharged and removed to the right and left sides, in a reliable manner.

If the rear upper inclined faces formed on the opposed faces of the mountain-like shape in the front view and the side inclined face located on each one of the right and left side faces of the track frame are formed continuously with a connecting side face that extends substantially along each one of the right and left side faces of the track frame 2, the cover can be formed integral, so that the number of parts can be reduced and the assembly can be simple.

As a preferred embodiment of the present invention, a rear scraper is provided on the right/left side face of the rear end of the track frame. This rear scraper will scrape off an amount of earth/sand stuck to the rear driven wheels. If this rear scraper is inclined downward in the right/left outward direction, this will result advantageously in causing the scraped-off earth/sand to drop off to the right/left outer side from the right/left wheel rolling face.

Further and other features and advantages of the invention will become apparent upon reading the following detailed disclosure of preferred embodiments thereof with reference to the accompanying drawings.

DETAILED DESCRIPTION OF THE PREFERRED EMBODIMENTS

Next, preferred embodiments of the present invention will be described with reference to the accompanying drawings. One or more features of one embodiment can be used in combination with one of more features of another or other embodiments. And, it is understood that such combinations too are intended to be encompassed within the claimed scope of the present invention, unless such combinations result in contradictions.

Figure 8:
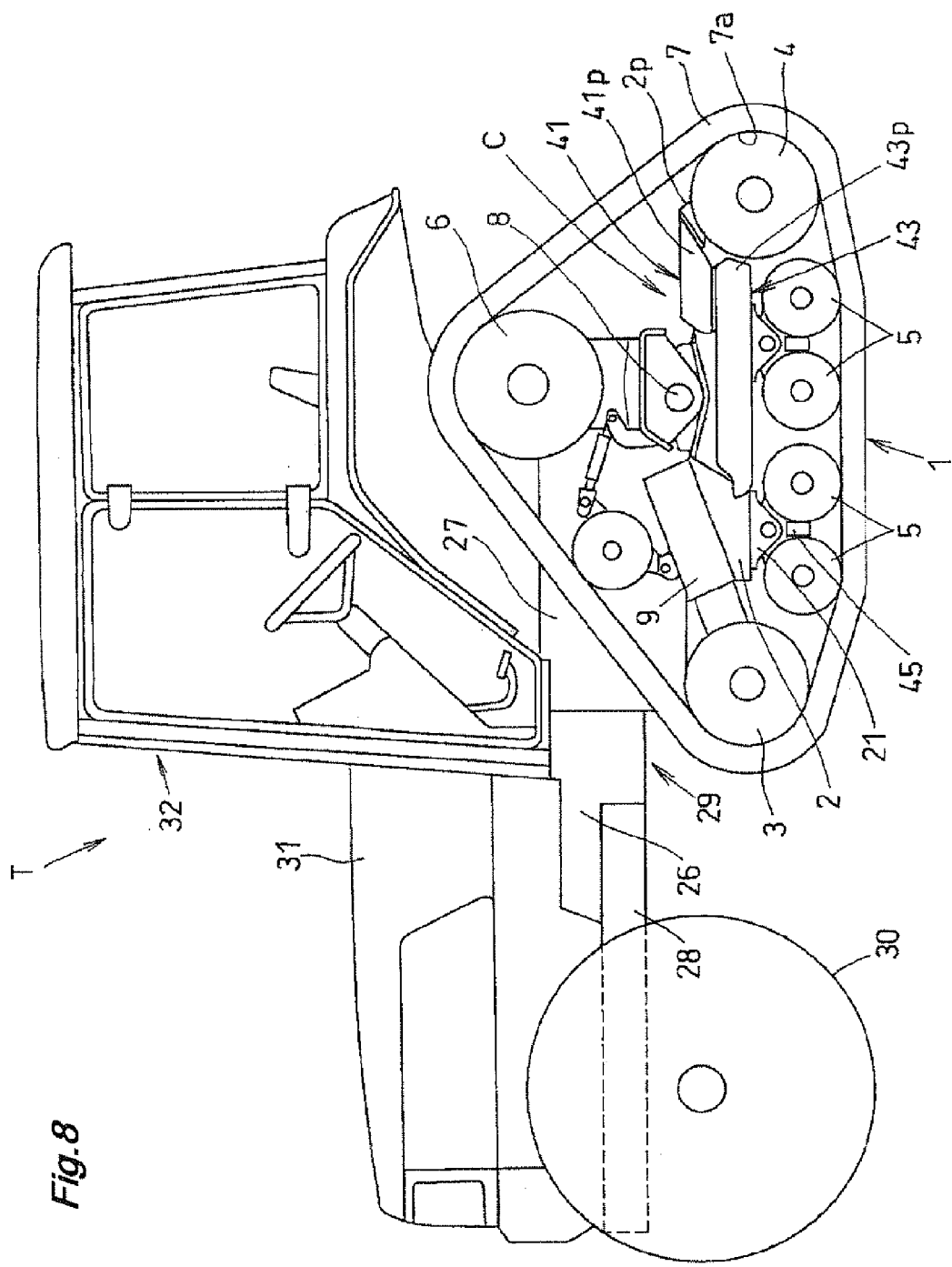
[FIG. 8] a side view showing a tractor in its entirety.

In FIG. 8, in a tractor T having a crawler traveling apparatus 1 as a "rear wheel", an engine 26, a transmission case 27, a front axle frame 28, etc. together constitute a traveling vehicle body 29, the front axle frame 28 suspends therefrom front wheels 30 as drivable and steerable wheels, the engine 26 is covered with a hood 31, a cabin 32 or a ROPS is mounted for covering the operating section and the driver's seat, and at a rear position of the traveling vehicle body 29, a rear implement such as a rotary plow is mounted via a hydraulic device and a three-point link mechanism to be pulled.

In FIGS. 1-8, referring to the crawler traveling apparatus 1, a track frame 2 is formed of angular members, plate members, pipe members, etc.; and this track frame 2 supports a tension adjusting front driven wheel (adjusting wheel) 3, a free rear driven wheel 4 and a plurality of free wheels 5 mounted therebetween, with these wheels being arranged in the front/rear (fore/aft) direction, and a drive wheel 6 disposed upwardly of the free wheels 5. A crawler 7 is entrained around all of the above wheels. The track frame 2 is configured to be pivotable about a pivot shaft 8 which extends parallel with and is disposed downwardly of the axis of the drive wheel 6.

The front driven wheel 3 is provided in a pair on the right and left sides, and these wheels are rotatably supported, via a support shaft 3A, to free ends of a downwardly inclined tension adjusting mechanism 9 provided on the upper face of the front end of the track frame 2.

The tension adjusting mechanism 9 includes a support body 11 secured to a forwardly downwardly inclined deck 35 provided on the upper face of the track frame 2, a shaft support body 10 supporting the support shaft 3A of the front driven wheel 3, a tension spring 12 that urges the shaft support body 10 toward the front driven wheel 3, and a slackness correcting means 13 for absorbing an amount of slackness which may occur in the crawler 7 by displacing the shaft support body 10 toward the front driven wheel 3.

Figure 2:
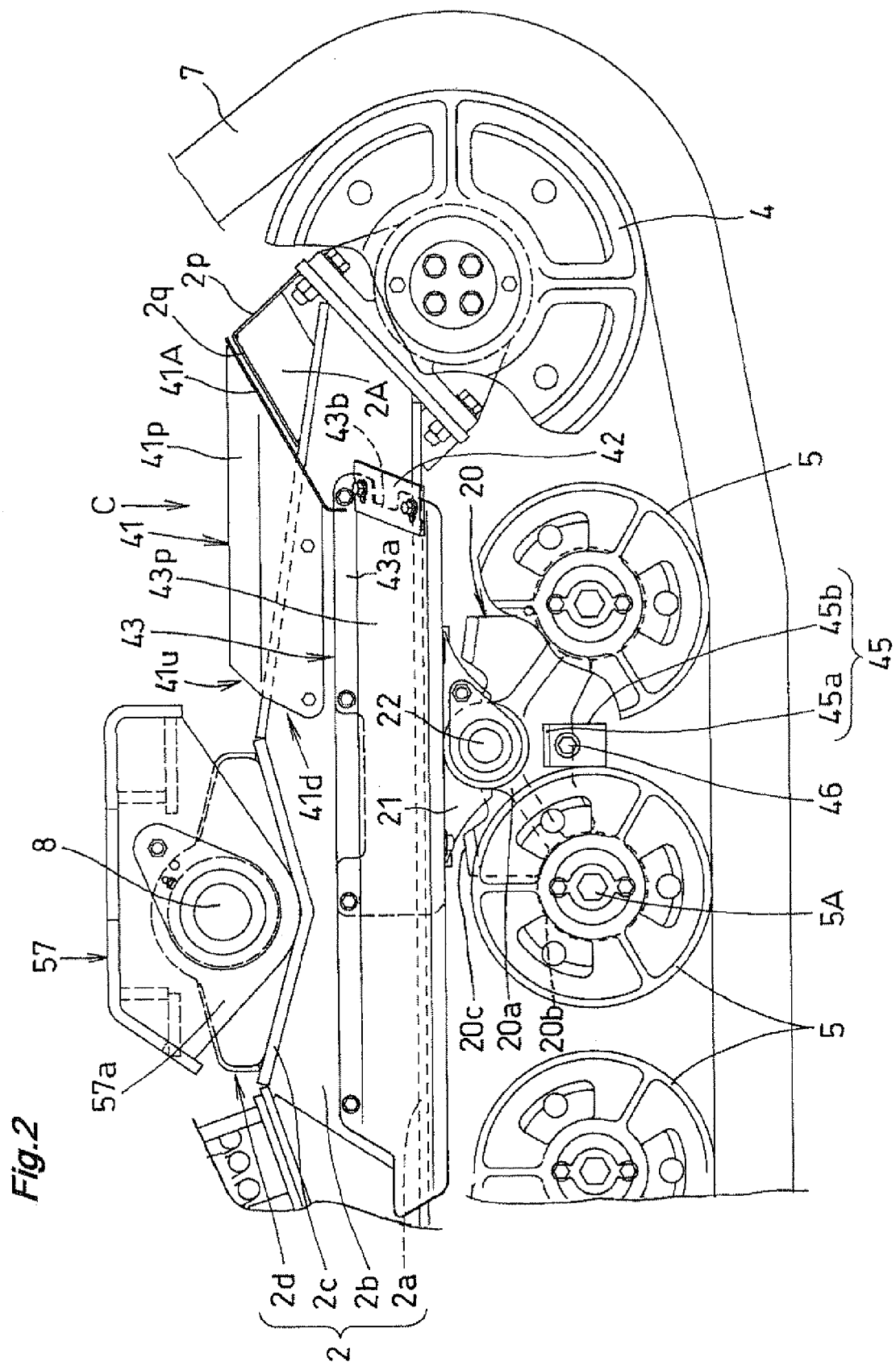
[FIG. 2] an enlarged side view showing principal portions.
Figure 3:
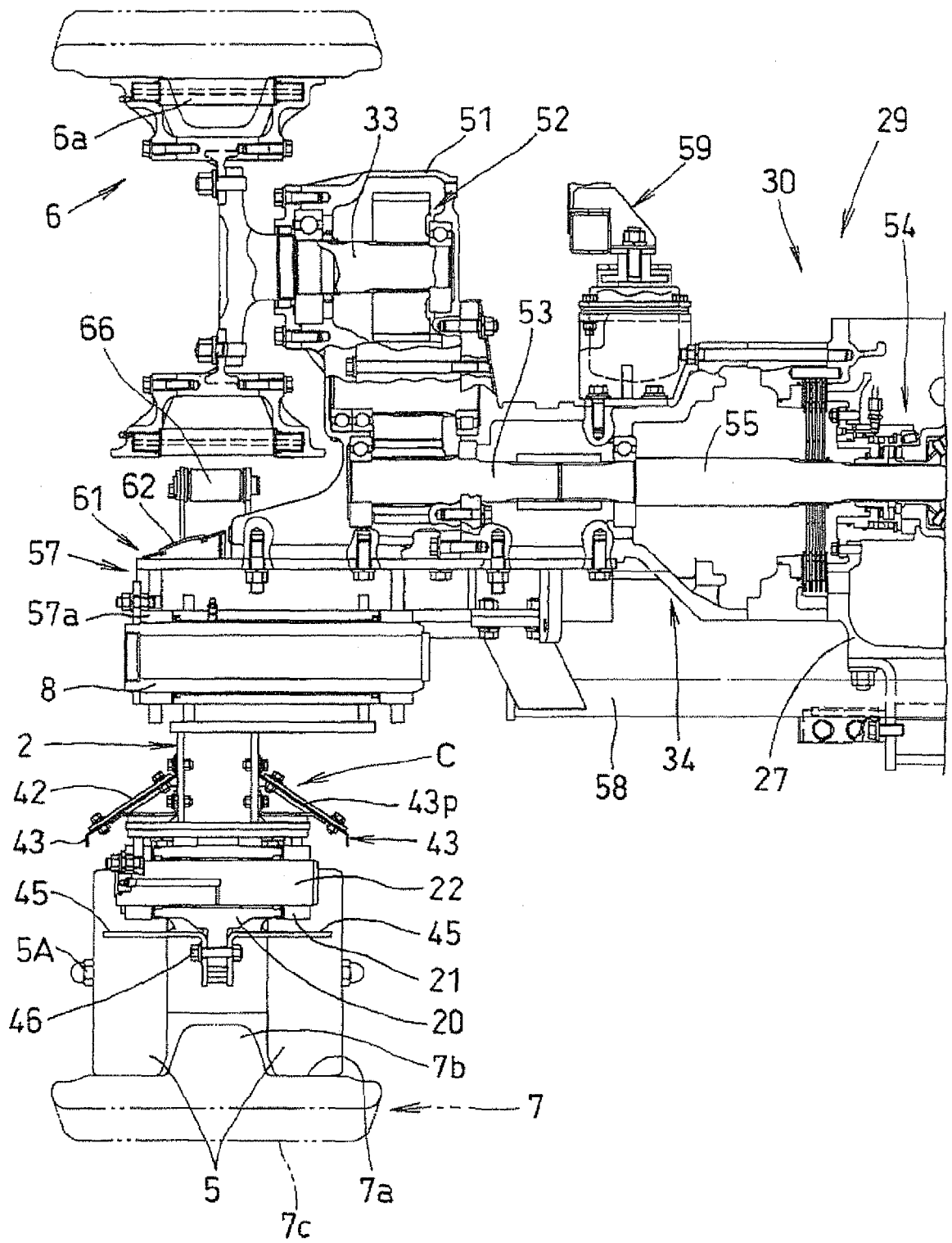
[FIG. 3] a rear view in section of a crawler traveling apparatus.
Figure 4:
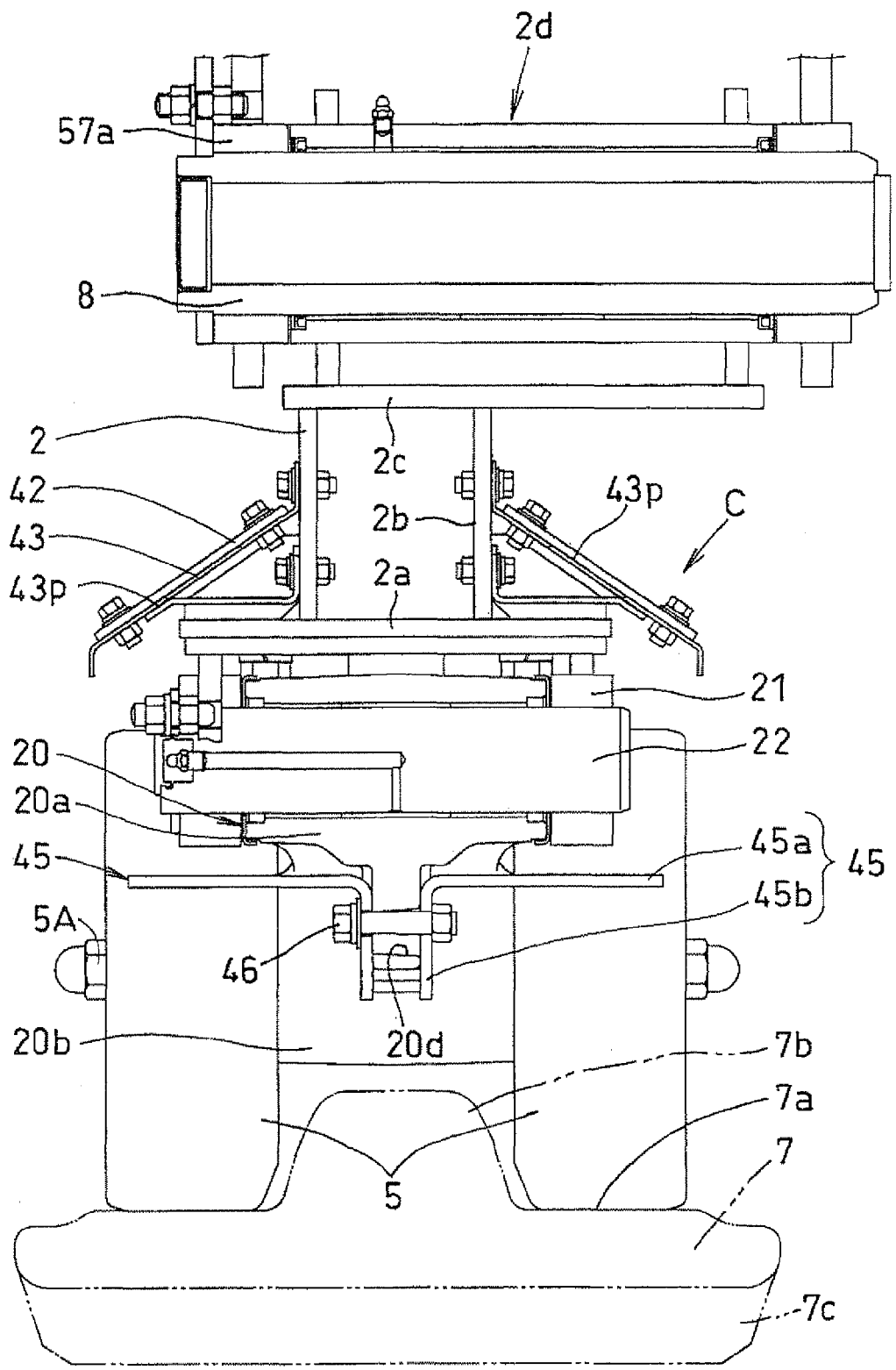
[FIG. 4] an enlarged rear view in section showing principal portions.

Referring to the track frame 2 in greater details, as shown in FIGS. 2 and 4, a pair of right and left side plates 2b are fixedly attached on a bottom plate 2a formed of a flat plate, an upper plate 2c is fixedly attached on the right and left side plates 2b and on this upper plate 2c, there is fixedly attached a boss body 2d loosely mounted on the pivot shaft 8, thus completing the track frame 2.

At the rear end of this track frame 2, a support shaft 4A of the rear driven wheel 4 is rotatably supported via a pair of right and left support bodies 14, and the rear driven wheel 4 is provided in a pair on the right and left sides across the rear end of the track frame 2.

The free wheel 5 has a smaller diameter than the front driven wheel 3 and the rear driven wheel 4, and four free wheels 5 are provided on the front and rear sides, and the respective free wheels 5 in the front/rear direction are provided in a pair on the right and left sides, thus constituting a "striding roller" assembly. These free wheels 5, together with the front and rear driven wheels 3, 4, roll on the right/left wheel rolling faces 7a.

Of the four front and rear free wheels 5, the two of them on the front side and the two of them on the rear side are provided respectively as a set, and each free wheel 5 of each set has its wheel shaft 5A pivotally supported to a front/rear end portion of an equalizing link ("seesaw" frame) 20. A front/rear intermediate portion of this equalizer link 20 is supported to be pivotable in a swing-like manner, via a pivot shaft 22 to a bracket 21 which in turn is fixed to the track frame 2.

The bracket 21 is bolt-fastened to the lower face of the bottom plate 2a of the track frame 2, and right and left ends of the pivot shaft 22 are supported to the bracket 21 and a boss portion 20a of the equalizer link 20 is loosely engaged on a right/left center portion of the pivot shaft 22.

The equalizer link 20 forms, at a lower portion of a portion thereof projecting from the boss portion 20a in the front/rear direction, a shaft support portion 20b supporting each front/rear wheel shaft 5A and also forms, at an upper portion of a portion thereof projecting in the front/rear direction, a stopper portion 20c which comes into contact with the bracket 21 (or the bottom plate 2a) thereby setting a pivot angle of the equalizer link 20.

If desired, the wheel shaft 5A could be disposed horizontal at substantially same height relative to the pivot shaft 22. In this embodiment, however, there is employed a triangular layout with the front and rear wheel shafts SB being disposed downwardly of the pivot shaft 22. In this embodiment, the distances from the pivot shaft 22 to the front/rear free wheels 5 are same equal to each other. But, one distance cold be set longer than the other.

In FIGS. 1-4, the horizontal distance from the pivot shaft 8 to the pivot shat 22 of the rear equalizer 120 is set shorter than the horizontal distance from the pivot shaft 8 to the pivot shaft 22 of the front equalizer 120, so that the load of the track frame 2 is born more by the two rear free wheels 2, than the two front free wheels. 2

The drive wheel 6 is a drive transmission member mounted on an outer end face of a rear axle (drive shaft) 33, and has a drive pin 6a between right and left discs. The rear axle 33 is supported to a rear axle case 34 projecting in the right/left direction from a rear portion of a transmission case 27 constituting the traveling vehicle body 29.

The rear axle case 34 is fixed to a rear side face of the transmission case 27 and a final speed changing case 51 is fixed to the outer end of this rear axle case 34. This final speed changing case 51 projects upward from the rear axle case 34 and incorporates therein a final speed changing mechanism (final reduction mechanism) 52 and supports therein a transmission shaft 53 as a input shaft and the rear axle 33 as the output shaft. To the transmission shaft 53 and inside the rear axle case 34, there is coupled an output shaft 55 of a rear wheel differential device 54.

At an upper portion of the rear axle case 34, there is provided a support deck 59 for attachment of rear posts of the cabin or rear posts of the ROPS.

To and across the lower faces of the rear axle case 34 and the final speed changing case 51, a mounting deck 57 is fixedly attached via fasteners. And, in right and left support bosses 57a of this mounting deck 57, the pivot shaft 8 formed of a tube, extends therethrough and is fixedly mounted therein. The mounting decks 47 of the right and left crawler traveling apparatuses 1 are connected to each other via a connecting member 58 that extends downwardly of the transmission case 27.

The lower portion of the final speed changing case 51 and the mounting deck 57 extend to the lower side of the drive wheel 6. And, the boss member 2d of the track frame 2 is pivotally engaged on the pivot shaft 8 between the right and left support bosses 57a of the mounting deck 57. With these arrangements, the track frame 2 is supported to the rear axle case 34 to be pivotable up/down via the pivot shaft 8.

The upper face of the lower portion of the final speed changing case 51 that is extended to the lower side of the drive wheel 6 is outwardly and downwardly inclined in the right/left direction And, continuously with this upper face inclined downwardly outward in the right/left direction, at the upper portion of the mounting deck 57, there is formed an earth dropping portion 61, so that an amount of earth/sand will not be accumulated on the upper face of the lower portion of the final speed changing case 51 or on the upper face of the mounting deck 57.

The earth dropping portion 61 of the mounting deck 57 defines, an opening for allowing injection of grease to the pivot shaft 8 through the mounting deck 57, with this opening being closed with a lid 62.

Between the front portion of the mounting deck 57 and the support body 11 of the tension adjusting mechanism 9, there is provided a guide mechanism 63 for guiding the crawler 7. This guide mechanism 63 includes a guide link 65 having one end thereof pivotally supported to the support body 11 and pivotally supporting a guide wheel 64 and a connecting link 66 interconnecting between the other end of the guide link 65 and the mounting deck 57.

The connecting link 66 is comprised of a turn buckle and manually adjustable in its length. After the adjustment, the length of the link is fixed and the link presses the guide wheel 64 against the crawler 7. However, the connecting link 66 is configured such that even when there occurs fine vibration in the crawler 7 in its thickness direction, the guide wheel 64 will not follow this vibration.

The right/left center of the drive wheel 6 is in substantial alignment with the right/left centers respectively of the track frame 2, the front and rear driven wheels 3, 4 and the free wheels 5, and its centerline extends between the right and left support bosses 57a of the mounting deck 57.

As the drive wheel 6 is disposed upwardly of the free wheels 5, this drive wheel 6 forms a triangular layout together with the front driven wheel 3 and the rear driven wheel 4, with the drive wheel 6 forming the upper apex of the triangle, the front driven wheel 3 and the rear driven wheels 4 forming lower apexes respectively. Then, the crawler (elastic endless belt) 7 entrained about all these wheels form an approximate triangular shape in its side view, and the free wheels 5 are located on the base of the approximate triangle.

The pivot shaft 8 has its axis located parallel with and downwardly of the axis of the rear axle 33. This axis of the pivot shaft could be located directly under the rear axle 33. In this embodiment, however, the axis is offset forwardly by a distance K from the immediate underside of the rear axle 33 and acts as a pivot center of the track frame 2 in the front/rear direction (the vertical direction at the front/rear end).

In the crawler traveling apparatus 1 having the approximate triangular lateral profile, the horizontal distance from the rear axle 33 to the front driven wheel 2 is set longer than the horizontal distance from the rear axle 33 to the rear driven wheel 4 and also, a horizontal distance L1 from the pivot shaft 8 to the front driven wheel 3 is set longer than a horizontal distance L2 from the pivot shaft 8 to the rear driven wheel 4.

With the arrangement that the axis of the pivot shaft 8 is located immediately under or forwardly of the rear axle 33 and the horizontal distance L1 from the pivot shaft 8 of the crawler traveling apparatus 1 to the front side portion is set slightly longer than the distance from the same to the rear side portion, when a tension is applied to the crawler 7 with the crawler traveling apparatus 1 being kept afloat, the front portion of the crawler traveling apparatus 1 will float so as to render equal the tension between the drive wheel 6 and the front driven wheel 3 and that between the drive wheel 6 and the rear driven wheel 4. Then, if the apparatus is allowed to be grounded under this condition, an upward force will be applied to the front portion of the traveling apparatus, which upward force facilitates riding of the apparatus over an obstacle. As a result, the traveling performance of the crawler traveling apparatus 1 in the field is improved and the traveling stability and the pulling force can be increased.

Figure 1:
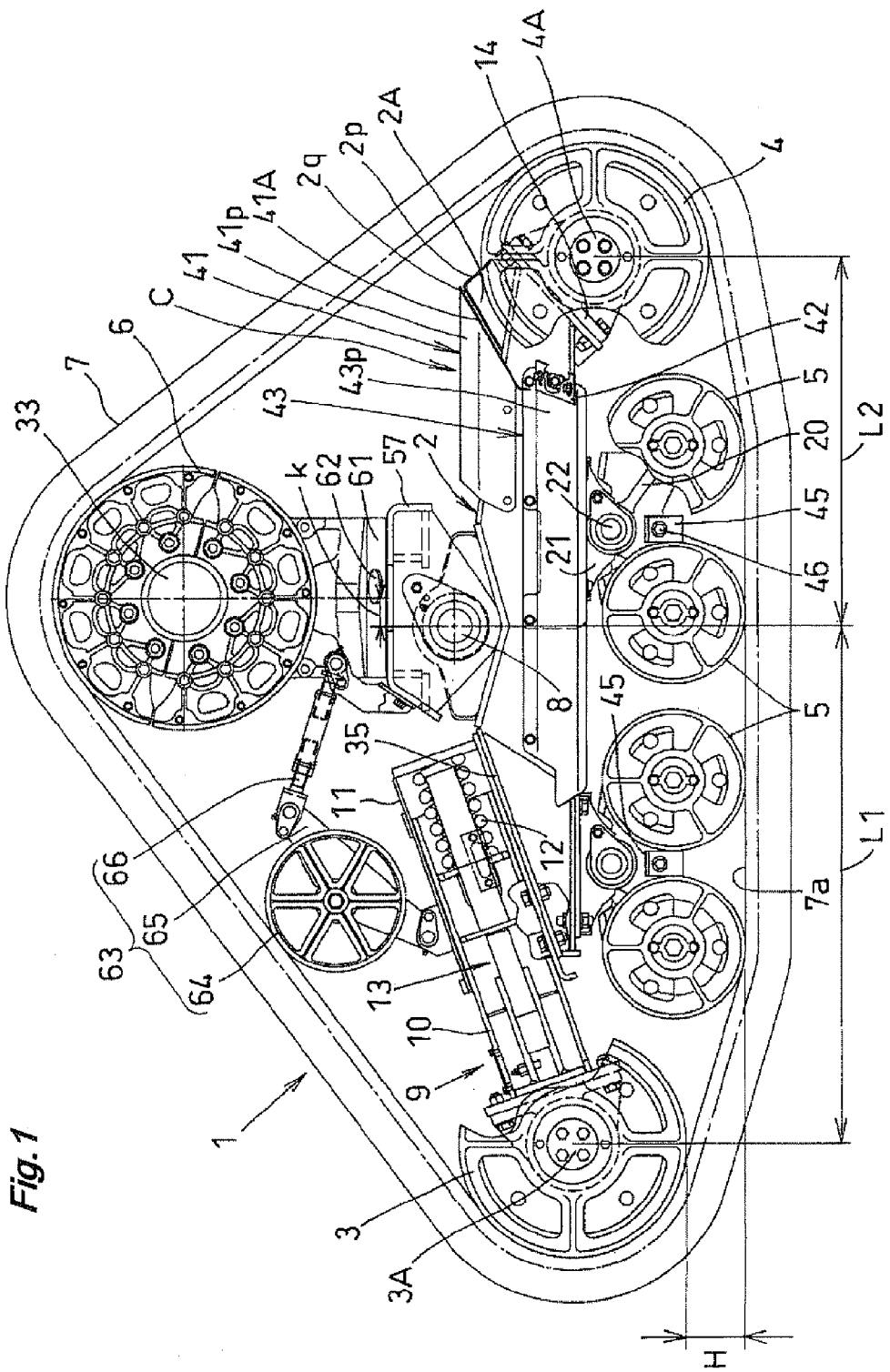
[FIG. 1] a side view showing an embodiment of the present invention.

The front and rear driven wheels 3, 4, as shown in FIG. 1, are disposed upwardly by a height H from the horizontal tangential line (inner peripheral face of the crawler 7) of the ground-surface side of the free wheels 5. Hence, even when the front driven wheel 3 is displaced downward away from the center of the crawler 7 as the result of tension adjustment, the front driven wheel 3 will always be located upwardly of the tangential line.

The crawler 7 can be an iron crawler. In this embodiment, however, there is employed a rubber roller having a tensile member embedded therein along the peripheral direction. And, along the widthwise center of its inner peripheral face, there are arranged, equidistantly in the peripheral direction, a number of engaging projections 7b engageable with drive pins 6a of the drive wheel 6 and the right and left sides of the engaging projections 7b together form a wheel rolling face 7a on which the front and rear driven wheels 3, 4 and the free wheels 5 roll. This crawler 7 could be formed, if desired, with a cored bar, as a tensile member, being embedded equidistantly along the peripheral direction.

In FIGS. 1-7, the rear end of the track frame 2 supports the pair of right and left rear driven wheels 4 via the shaft support bodies 14. And, the upper face of the upper portion of the rear end of this track frame 2 is inclined rearwardly downward and on its upper face, there is formed a projecting portion 2A having a mountain-like profile in its side view, and the rear face of this projecting portion 2A constitutes an inclined face 2p inclined rearwardly downward and the front face of the projecting portion 2A constitutes an inclined face 2q inclined forwardly downward.

The inclined face 2p of the rear face guides an amount of earth/sand being dropped from the crawler 7 rearward between the right and left rear driven wheels 4 rather than allowing it to drop on the right and left sides, thus preventing progressive accumulation of earth/sand on the wheel rolling face 7a.

At a rear portion of the track frame 2, there is provided a cover C for covering the upper face and the right and left side faces. This cover C includes a rear upper cover 41 provided at a rear portion of the track frame 2 and side covers 43 provided on the respective right and left side faces. The rear upper cover 41 and the side covers 43 are formed of metal plates (or synthetic resin).

On the front side of the inclined face 2p and adjacent thereto, the rear upper cover 41 is mounted to the rear upper portion of the track frame 2. This rear upper cover 41 has its upper portion 41u having a mountain-like profile in its front view and a lower portion 41d thereof extends from the right and left ends of the upper portion 41u, thus forming a pair of right and left vertical walls along the side faces of the track frame 2.

The upper portion 41u includes, on each of its opposed faces of the mountain-like profile, a rear upper inclined face 41p which is inclined first outwardly downward in the right/left direction and then inclined upward, so as to be capable of guiding an amount of earth/sand dropped thereon from the upper side of the track frame 2 to the right and left outer sides.

Further, the rear end of the upper portion 41u and the lower portion 41d of the rear upper cover 41 has an upwardly inclined shape along the inclined face 2q of the projecting portion 2A, and at this rear end, there is formed an eaves portion 41A protruding from the rear upper inclined face 41p to the vicinity of the outer side faces of the right and left rear driven wheels 4.

Figure 5:
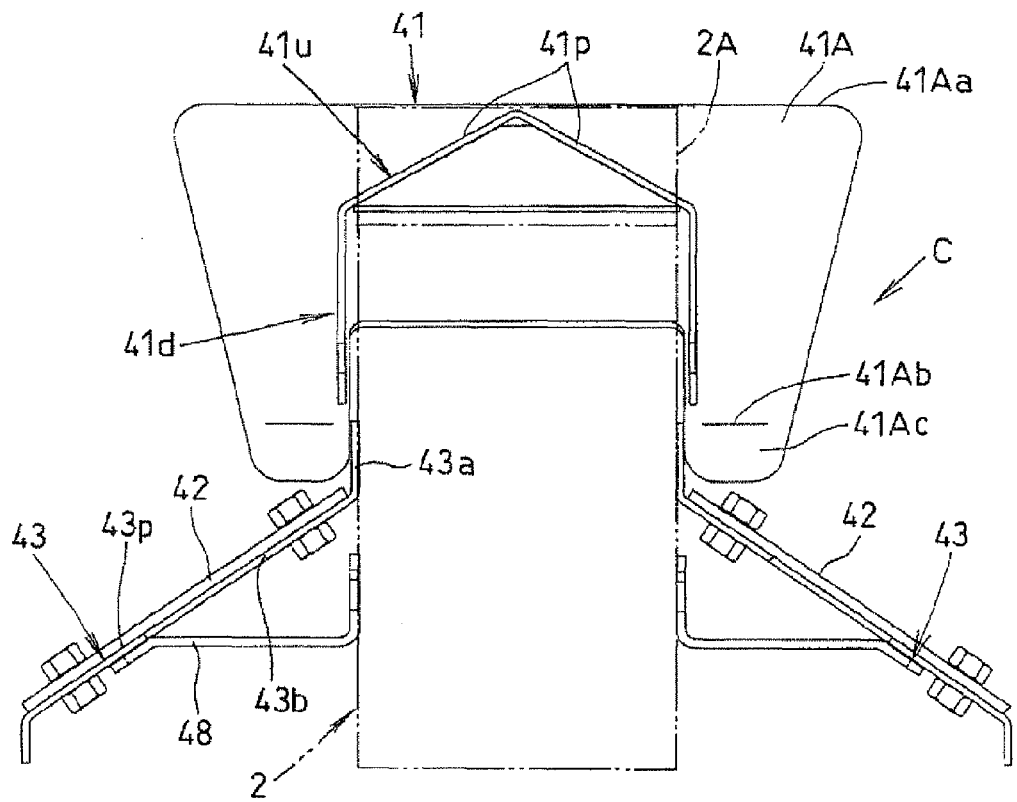
[FIG. 5] a rear view in section showing a cover and a scraper.
Figure 5:
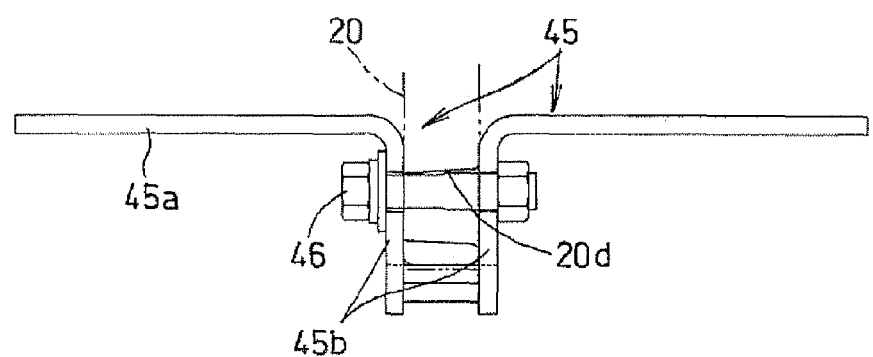
Figure 6:
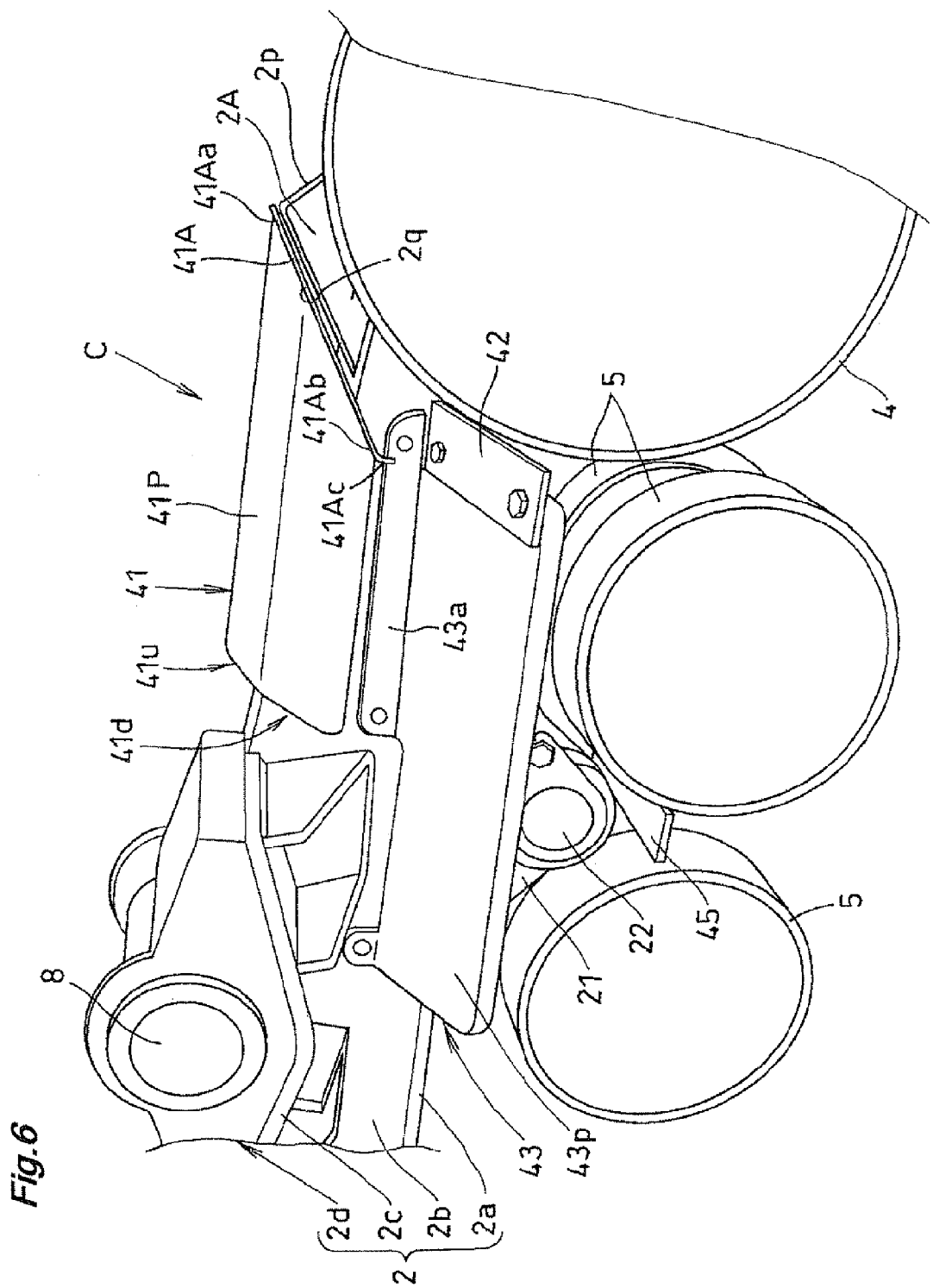
[FIG. 6] a perspective view of the principal portions of the present invention as viewed sideways.
Figure 7:
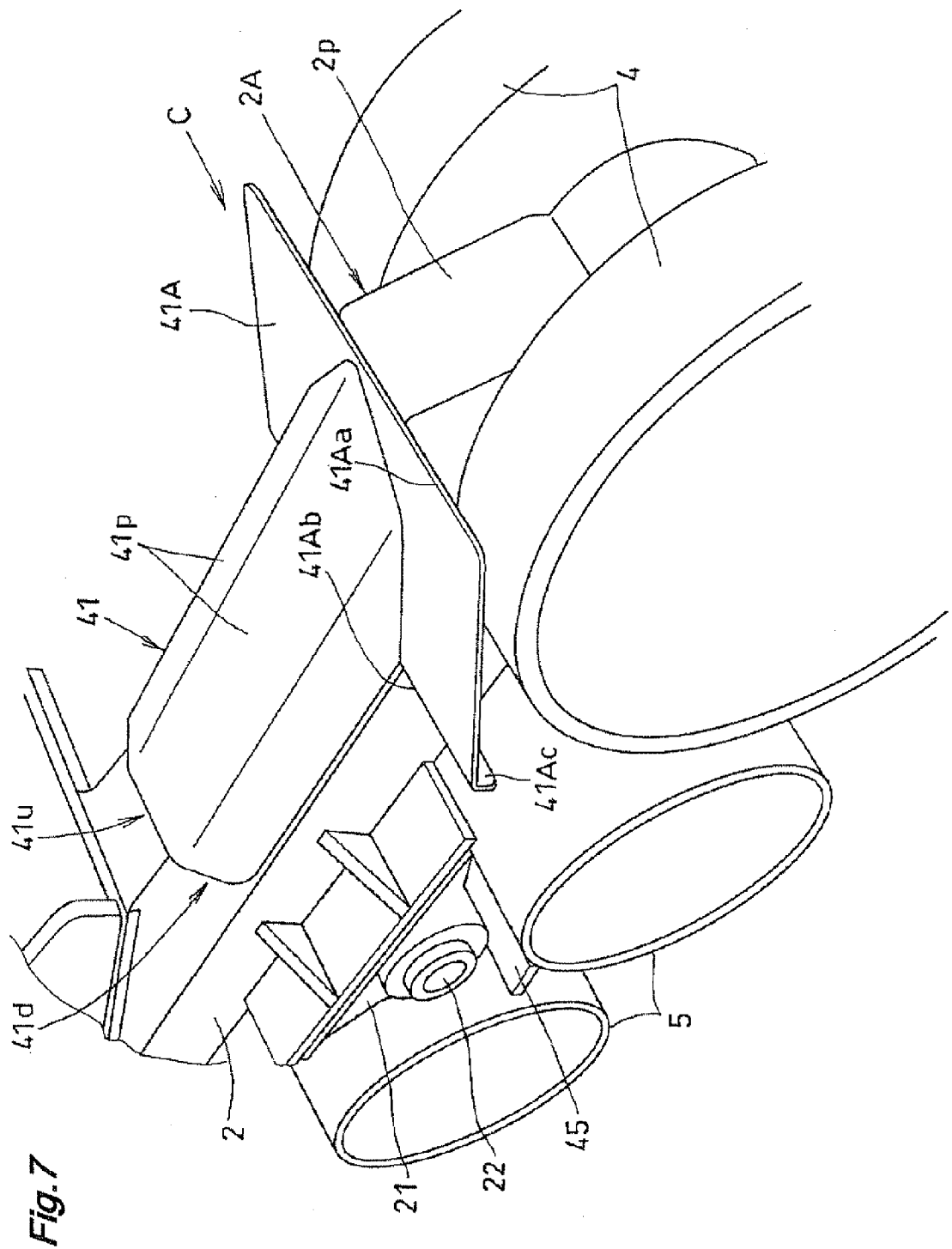
[FIG. 7] a perspective view of the principal portions of the present invention as viewed from rear upper side.

Referring to this eaves portion 41A in greater details, as shown in FIGS. 5-7, its upper edge 41Aa is located at the same height as the top of the upper portion 41u and is inclined downward in the forward direction from this upper edge 41Aa to its lower end 41Ab located at the same height as the lower ends of the right and left vertical walls of the lower portions 41d, and further, there is formed a drooping portion 41Ac drooping from the lower end 41Ab. The right/left width from the upper edge 41Aa to the lower end 41Ab decreases progressively, so that an amount of earth/sand dropped onto the right and left rear driven wheels 4 can be guided to drop to their front sides.

A side cover 43 is provided downwardly of the rear upper cover 41 of each one of the right and left side faces of the track frame 2. This side cover 43 extends from the vicinity of the rear driven wheel 4 to the second free wheel 5 from the front side (or to the free wheel 5 located third from the front, as shown by the dot lines in FIGS. 1 and 2 and by the solid line in FIG. 6), and each one of the right and left side covers 43 includes, downwardly of its attaching portion 43a, an inclined side face which is inclined outwardly downward in the right/left direction.

The inclined side face 43p of the side cover 43 covers at least the right/left upper side of the two rear free wheels 5 which project outward in the right/left direction from the track frame 2, so that the amount of earth/sand which has been guided to drop by the rear upper inclined face 41p and the eaves portion 41A of the rear upper cover 41, can be guided to drop further outward in the right/left direction.

With the above-described arrangements, the earth/sand can be guided to the outer right and left sides of the wheel rolling face 7a. Consequently, even when an amount of earth/sand enters onto the inner peripheral face of the crawler 7, as this earth/sand is moved in circulation, it can be discharged gradually from the positions of the rear driven wheels 4 and the wheel rolling face 7a to the right and left outer sides.

The side cover 43 has its upper attaching portion 43a bolt-fastened to each one of the right and left side faces of the track frame 2 and further, includes a stay 48 at the rear end of its lower face, so that the cover 43 is mounted to the track cover 2 via this stay 48 also.

At the rear end of the side cover 43, there is formed a cutout 43b allowing insertion of a tool for attachment of the stay 48, and there is also provided a rear scraper 42 capable of covering this cutout 43b from the view.

The rear scraper 42 is provided in each right/left side cover 43 to be adjustable in its front/rear position (the distance from the rear driven wheel 4) and to be replaceable. The rear edge of this rear scraper 42 is inclined along the inclined side face 43p and located adjacent the rear driven wheel 4, so as to scrape off an amount of earth/sand stuck to the rear driven wheel 4 and as this scraper is inclined downward outwardly in the right/left direction, the earth/sand can be guided to drop to the right/left outer sides of the wheel rolling face 7a.

The equalizer link 20 includes a pair of right and left free scrapers 45 immediately under the pivot shaft 22. Each of these free scrapers 45 is formed by bending a band plate into an L-shape and then two of them are connected to each other, with one piece thereof constituting a scraping portion 45a being adjacent the rear two free wheels 5 simultaneously for scraping off an amount of earth/sand adhering thereto, the other piece thereof constituting an attaching portion 45b to be located close to the equalizer 120 to be attached thereto.

The equalizer 120 forms an elongated groove 20d elongate in the vertical direction. The equalizer link 20 and the right/left free scraper 45 are fastened together by means of a fastener 46 such as a bolt that extends through the elongate groove 20d of the equalizer link 20 and the right/left free scraper 45.

By means of the elongated groove 20d, the right/left free scraper 45 is adjustable in its vertical position relative to the equalizer link 20. And, with this vertical position adjustment, the distance from the free wheel 5 located forwardly or rearwardly thereof can be adjusted.

As the right/left free scraper 45 is attached to the equalizer 120, even when the equalizer link 20 is pivoted, thereby vertically pivoting the free wheel 5, the positional relationship thereof relative to the free wheel 5 can be fixedly maintained, so that an amount of earth/sand stuck to the free wheels 5 can always be scraped off during traveling.

Figure 9:
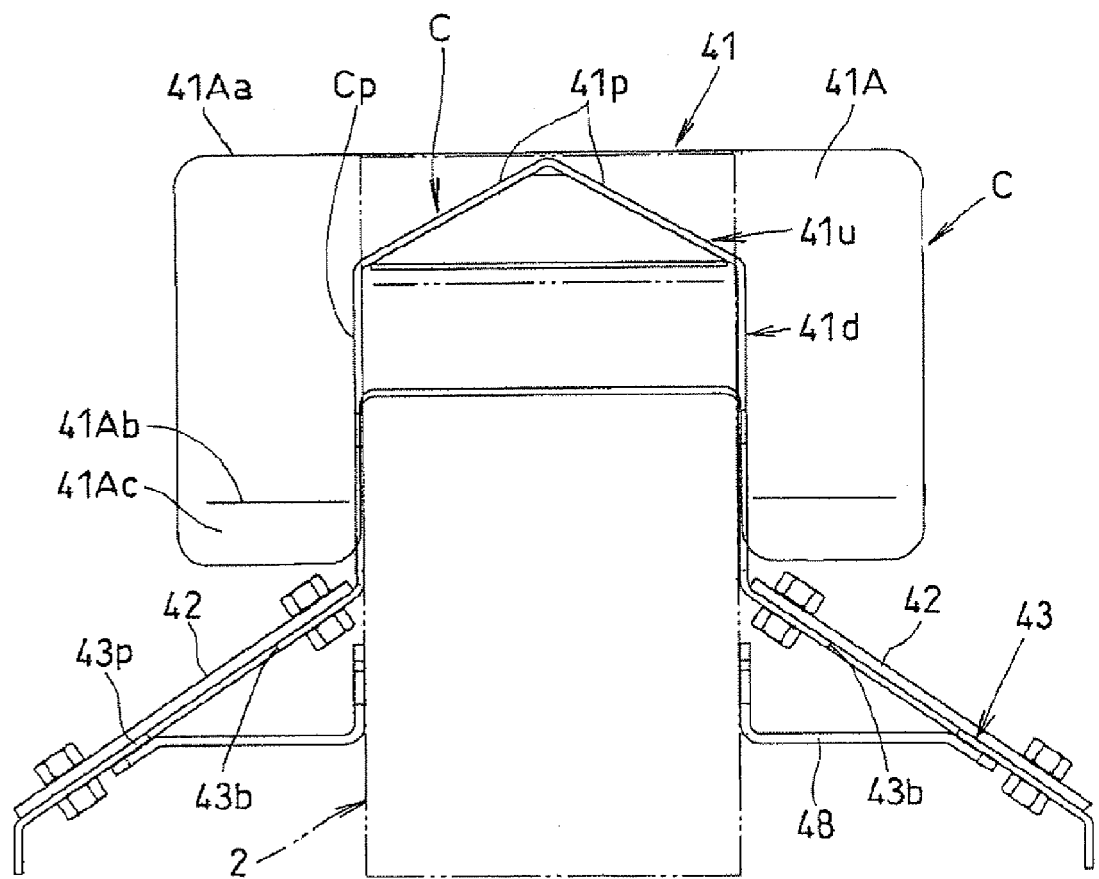
[FIG. 9] a rear view in section showing a modified construction of the present invention.
Figure 9:
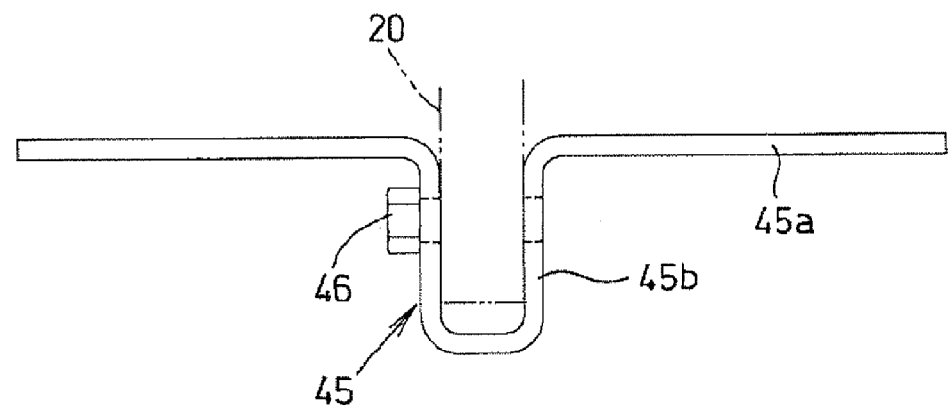

FIG. 9 shows a modified embodiment of the present invention, in which the cover C is provided as an integral component, rather than being comprised of the rear upper cover 41 and the side covers 43 separately of each other. That is, the cover C is formed by forming a single metal plate into the mountain-like profile in the front view at the right/left center thereof, thereby forming right and left rearward upwardly inclined faces 41p of the rear upper cover 41 and a connecting side face Cp acting also as an attaching portion. Further, from the lower end of this connecting side face Cp, right and left skirts are extended downward in the right and left outer sides, thus forming right and left side inclined faces 43p of the side covers 43 and rear scrapers 42 are detachably attached to the rear end of the side covers 43.

The eaves portion 41A is inclined downward forwardly from the upper edge 41Aa to the vicinity of the right and left rear upper inclined faces 41p, and further extends downward from the inclined lower end 41Ab to form a drooping portion 41Ac. The distance between the right and left edges from the upper edge 41Aa to the lower edge 41Ab is substantially same.

The free scraper 45 is provided as a single component comprised of a pair of right and left attaching portions 45b interconnected at the lower ends thereof. That is, the scraper is formed by bending a band plate into the form of a crank and the right and left scraping portions 45a and the right and left attaching portions 45b are formed integral and engaged with the equalizer link 20 from the lower side thereof.

In the foregoing embodiment and the modified embodiment described above, the right/left free scraper 46 is disposed with its scraping portion 46a being arranged substantially horizontal. Instead, like the rear scraper 42, this can be inclined downward in the right/left outer direction.

Next, an earth/sand removing operation by the crawler traveling apparatus 1 having the above-described construction will be described next.

An amount of earth/sand accumulated on and adhering to the crawler inner peripheral face is raised from the lower side to the upper side as being circulated about the rear driven wheel 4 in association with a forward traveling of the crawler 7 and will be caused to drop onto the rear upper portion of the track frame 2 and then circulated as being placed on the crawler inner peripheral face.

An amount of earth/sand which has dropped through between the right and left driven wheels 4 onto the upper portion of the rear end of the track frame 2 will be caused to drop rearward as being guided by the inclined face 2p on the rear face side of the projecting portion 2A and will be placed on the crawler inner peripheral face between the right and left wheel rolling faces 7a, and will be circulated without being accumulated on the track frame 2.

The earth/sand which has been removed from the upper face of the track frame 2 by the rear upper inclined face 41p is guided to drop in the right/left outer direction by the side inclined faces 43p of the side covers 43 provided on the right and left side faces of the track frame 2, thus being prevented from being accumulated on the two rear free wheels 5 and the right and left wheel rolling faces 7a.

Forwardly of the inclined face 2p of the projecting portion 2A, the eaves portion 41A at the rear end of the rear upper cover 41 is located. With this, the eaves portion 41A prevents the earth/sand from dropping toward the right and left rear driven wheels 4, so that this earth/sand will be guided to drop onto the side inclined faces 43p of the side covers 43.

The amount of earth adhering to the right and left rear driven wheels 4 is scraped off by the rear scrapers 42 provided at the rear ends of the right and left side covers 43, so that like the side inclined faces 43p, the earth will be guided to drop to the right/left left outer direction, thus being prevented from being accumulated on to the right and left wheel rolling faces 7a.

An amount of earth adhering to the rear two free wheels 5 will be scraped off by the pair of right and left free scrapers 45 provided on the equalizer links 20 and will be dropped to the right and left outer sides of the right and left wheel rolling faces 7a.

The amount of earth/sand which has been dropped to the right and left outer sides from the right and left wheel rolling faces 7a on the inner peripheral faces of the crawlers 7 will not be treaded on by the rear driven wheel 4 or free wheels 5, thus not damaging the crawlers 7. The amount of earth/sand stuck to the inner peripheral face of the crawler 7 will be moved in circulation in association with traveling, but this will be gradually discharged to the outer sides of the crawlers 7 by e.g. the side inclined faces 43p of the right and left side covers 43.

Incidentally, the shapes, and the fore/aft, right/left, upper/lower positional relationships of the respective components used in the foregoing embodiment are best when constructed as shown in FIGS. 1-8. It is understood; however, that the present invention is not limited thereto, the components and arrangements, constructions thereof may be modified in many ways and may be used in different combinations.

For instance, if an upward force is applied to the front portion of the crawler traveling apparatus 1 when a tension is applied to the crawler 7, it will not be problematic for the pivot shaft 8 to be located downwardly of and with a slight rearward offset relative to the center of the drive wheel G. And, of the free wheels 5, only those two on the rear side may be supported by the equalizer link 20, while the remaining two on the front side may be supported individually to the track frame 2.

Further, as to the cover C, each one of the pair of right and left plate members may form the rear upper inclined face 41p, the connecting side face Cp and the side inclined face 43p, with the two plate members being connected to each other at their upper portions by means of fastening or fusing.

Further, the eaves portion 41A of the rear upper cover 41 may be formed separately of the member having the right/left rear upper inclined face 41p, and a rearwardly and downwardly oriented piece may be projected rearwardly and downwardly from the member having the eaves portion 41A, so that this inclined face 2p may be formed on this rearwardly and downwardly projecting portion.

What is claimed is:
1. A crawler traveling apparatus comprising:
a traveling vehicle body having a rear axle case;
a track frame supported via a pivot shaft to the rear axle case;

a pair of front and rear driven wheels mounted at front and rear end portions of the track frame, a pair of said rear driven wheels being provided on the right and left sides across a rear end portion of the track frame;

a free wheel mounted at an intermediate portion of the track frame;

a crawler entrained about a drive wheel, said front and rear driven wheels and said free wheel;

a rearwardly downward inclined face formed at an upper portion of the rear end portion of the track frame, said inclined face being configured to cause an amount of earth/sand to drop off its surface; and a rear upper cover provided at an upper portion of the rear portion of the track frame in the vicinity of said inclined face, said rear upper cover forming a rear upper inclined face that is oriented downward in the right/left outward direction, said rear upper inclined face being configured to cause an amount of earth/sand to drop off its surface.

2. The crawler traveling apparatus according to claim 1, wherein at an upper portion of the rear end of the track frame, there is formed a projecting portion having a mountain-like profile in its side view, and a rear face of this projecting portion forms said inclined face.

3. The crawler traveling apparatus according to claim 1, wherein said rear upper cover has a mountain-like profile in a front view thereof and said rear upper inclined faces are formed in opposed faces of the mountain-like profile; and at a rear end portion of said rear upper cover, there is formed an eaves portion projecting from the rear upper inclined faces to the vicinity of the outer side faces of the right and left rear driven wheels, said eaves portion being configured to allow an amount of earth/sand to drop off its surface.

4. The crawler traveling apparatus according to claim 3, wherein downwardly of a front lower portion of said eaves portion, there is provided a rear scraper.

5. The crawler traveling apparatus according to claim 1, wherein on right and left side faces of the rear end of said track frame, there are provided rear scrapers inclined downwardly in the right/left outer direction, said rear scrapers being capable of allowing an amount of earth adhering to the rear driven wheel to drop off the same.

6. A crawler traveling apparatus comprising:
a traveling vehicle body having a rear axle case;
a track frame supported via a pivot shaft to the rear axle case;
a pair of front and rear driven wheels mounted at front and rear end portions of the track frame, a pair of said rear driven wheels being provided on the right and left sides across a rear end portion of the track frame;
a free wheel mounted at an intermediate portion of the track frame;
a crawler entrained about a drive wheel, said front and rear driven wheels and said free wheel; and
a cover provided at a rear portion of the track frame, the cover covering upper face and right and left side faces of the track frame; said cover including:
a rear upper inclined face that is located in the upper face of the track frame and oriented downward in the right/left outward direction, said rear upper inclined face being configured to cause an amount of earth/sand to drop off its surface; and
a side inclined face that is located on each one of right and left side faces of the track frame and oriented downward in the right/left outward direction, said side inclined face being configured to cause an amount of earth/sand to drop off its surface.

7. The crawler traveling apparatus according to claim 6, wherein said each free wheel is provided in a pair on the right and left sides and projects in the right/left direction from the track frame, and said each side inclined face covers at least right and left upper sides of rear two free wheels.

8. The crawler traveling apparatus according to claim 6, wherein said cover includes a rear upper cover provided at a rear portion of the track frame and side covers provided in right and left side faces of the track frame; and
said rear upper cover has a mountain-like profile in a front view thereof and said rear upper inclined faces are formed in opposed faces of the mountain-like profile, and said side covers form said side inclined faces.

9. The crawler traveling apparatus according to claim 6, wherein in said cover, there are continuously formed, said rear upper inclined face and said side inclined faces with a connecting side face extending approximately along each one of the right and left side faces of the track frame; and
said rear upper inclined faces are formed on opposed faces of a mountain-like profile in front view of the cover and said side inclined faces are located on the right and left side faces of the track frame.

10. The crawler traveling apparatus according to claim 8, wherein at a rear end of said side cover, there is provided a rear scraper.

11. The crawler traveling apparatus according to claim 6, wherein on right and left side faces of the rear end of said track frame, there are provided rear scrapers inclined downwardly in the right/left outer direction, said rear scrapers being capable of allowing an amount of earth adhering to the rear driven wheel to drop off the same.

12. A crawler traveling apparatus comprising:
a traveling vehicle body having a rear axle case;
a track frame supported via a pivot shaft to the rear axle case;
a pair of front and rear driven wheels mounted at front and rear end portions of the track frame, a pair of said rear driven wheels being provided on the right and left sides across a rear end portion of the track frame;
a free wheel mounted at an intermediate portion of the track frame;
a crawler entrained about a drive wheels said front and rear driven wheels and said free wheel;
a rearwardly downward inclined face formed at an upper portion of the rear end portion of the track frame, said inclined face being configured to cause an amount of earth/sand to drop off its surface; and
a cover provided at a rear portion of the track frame, the cover covering upper face and right and left side faces of the track frame; said cover including:
a rear upper inclined face that is located in the upper face of the track frame and oriented downward in the right/left outward direction, said rear upper inclined face being configured to cause an amount of earth/sand to drop off its surface; and
a side inclined face that is located on each one of right and left side faces of the track frame and oriented downward in the right/left outward direction, said side inclined face being configured to cause an amount of earth/sand to drop off its surface.

13. A crawler traveling apparatus comprising:
a traveling vehicle body having a rear axle case;
a track frame supported via a pivot shaft to the rear axle case;
a pair of front and rear driven wheels mounted at front and rear end portions of the track frame, a pair of said rear driven wheels being provided on the right and left sides across a rear end portion of the track frame;

a free wheel mounted at an intermediate portion of the track frame;

a crawler entrained about a drive wheel, said front and rear driven wheels and said free wheel;

a rearwardly downward inclined face formed at an upper portion of the rear end portion of the track frame, said inclined face being configured to cause an amount of earth/sand to drop off its surface; and a cover provided at a rear portion of the track frame, the cover covering upper face and right and left side faces of the track frame; said cover including:

a side inclined face that is located on each one of right and left side faces of the track frame and oriented downward in the right/left outward direction, said side inclined face being configured to cause an amount of earth/sand to drop off its surface.

* * * * *

UNITED STATES PATENT AND TRADEMARK OFFICE
CERTIFICATE OF CORRECTION

| | |
|---|---|
| PATENT NO. | : 8,020,948 B2 |
| APPLICATION NO. | : 12/548055 |
| DATED | : September 20, 2011 |
| INVENTOR(S) | : Motonari Inaoka |

It is certified that error appears in the above-identified patent and that said Letters Patent is hereby corrected as shown below:

Column 12, Line 43, Claim 12, delete "wheels" and insert -- wheel --

Signed and Sealed this
Tenth Day of January, 2012

David J. Kappos
*Director of the United States Patent and Trademark Office*